United States Patent
O'Connor et al.

(10) Patent No.: US 10,357,883 B1
(45) Date of Patent: Jul. 23, 2019

(54) END EFFECTOR HAVING PLIABLE BLADDER WITH ADJUSTABLE RIGIDITY

(71) Applicant: Amazon Technologies, Inc., Seattle, WA (US)

(72) Inventors: Michael James O'Connor, Charlestown, MA (US); Gregory Coleman, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/966,802

(22) Filed: Apr. 30, 2018

(51) Int. Cl.
*B25J 15/06* (2006.01)
*B25J 15/00* (2006.01)

(52) U.S. Cl.
CPC ......... *B25J 15/0023* (2013.01); *B25J 15/065* (2013.01); *B25J 15/0683* (2013.01)

(58) Field of Classification Search
CPC .. B25J 15/0023; B25J 15/0616; B25J 15/065; B25J 15/0683; B25J 15/0691; B25J 9/14; B25J 9/1612
USPC ................................ 294/86.4, 183, 185, 189
See application file for complete search history.

(56) References Cited

U.S. PATENT DOCUMENTS

| 4,294,424 | A | * | 10/1981 | Teissier | ................. | B25B 11/007 |
| | | | | | | 248/205.9 |
| 4,469,100 | A | * | 9/1984 | Hardwick | ........ | A61B 17/22032 |
| | | | | | | 604/908 |
| 4,561,686 | A | * | 12/1985 | Atchley | ................. | B66C 1/0206 |
| | | | | | | 294/188 |
| 5,467,525 | A | * | 11/1995 | Pine | .......................... | B23Q 3/08 |
| | | | | | | 29/743 |
| 6,419,291 | B1 | * | 7/2002 | Preta | ................. | A61B 17/22031 |
| | | | | | | 294/119.3 |
| 6,846,029 | B1 | * | 1/2005 | Ragner | ..................... | B25B 9/00 |
| | | | | | | 294/219 |
| 9,440,359 | B2 | * | 9/2016 | Spicer | .................... | B25J 15/008 |
| 9,457,477 | B1 | * | 10/2016 | Rublee | ................. | B25J 15/0023 |
| 9,623,570 | B1 | * | 4/2017 | Krahn | ................. | B25J 15/0023 |
| 2013/0106127 | A1 | * | 5/2013 | Lipson | ................. | B25J 15/0023 |
| | | | | | | 294/189 |
| 2017/0072572 | A1 | * | 3/2017 | Wagner | ................. | B25J 15/0616 |

FOREIGN PATENT DOCUMENTS

DE         102012009011 A1 *  12/2012  .......... B25J 15/0023

OTHER PUBLICATIONS

Brown et al, "Universal robotic gripper based on the jamming of granular material," PNAS, Accepted by the Editorial Board Sep. 17, 2010 (received for review Mar. 6, 2010), 6 pages.
Schmalz.com, "Vacuum Technology," [accessed online] https://www.schmalz.com/en/vacuum-technology-for-automation/vacuum-components/vacuum-suction-cups/bellows-suction-cus-round/bellows-suction-cups-fsga-1-5-folds.

* cited by examiner

*Primary Examiner* — Dean J Kramer
(74) *Attorney, Agent, or Firm* — Patterson + Seridan, LLP

(57) ABSTRACT

End effectors and a related method of actuating items are disclosed. The end effector comprises a bladder comprising a pliable body that defines an inner recess in fluid communication with the manifold via a first connection. The pliable body has a sealing surface at its distal end and defines a chamber. The bladder further comprises a material disposed within the chamber. The method comprises contacting an item to conform the sealing surface to a contour of the item, transitioning the bladder to a structural state having greater rigidity, applying a vacuum to the inner recess via the first connection, and actuating the item.

19 Claims, 11 Drawing Sheets

END EFFECTOR HAVING PLIABLE BLADDER WITH ADJUSTABLE RIGIDITY

BACKGROUND

The present disclosure relates to actuating items using an end effector, and more specifically, to implementations of a suction-based end effector having a pliable bladder with adjustable rigidity.

In warehouse operations and other industrial automation settings, end effectors may be configured to perform the picking and handling of items. For example, end effectors such as suction cups or vacuum cups may be used to suction items as they are being actuated between locations in a warehouse. The performance of suction-based end effectors is largely dependent on the quality of the seal formed with the suctioned item. More specifically, a suctioned item may be dropped by the end effector and/or damaged when inertial forces caused by moving the item overcome the suction force. This result is more likely for heavier items, as well as for complex-shaped items for which forming a higher-quality seal may be difficult.

Further, the design of an end effector may be optimized for picking and handling a particular type of item, or for items with one or more characteristics such as dimensions or weights. Thus, performance can be affected when the end effector is required to handle various types of items.

BRIEF DESCRIPTION OF DRAWINGS

Various embodiments in accordance with the present disclosure will be described with reference to the drawings, where like designations denote like elements.

DETAILED DESCRIPTION

While conventional suction-based end effectors may be effective at actuating items having planar surfaces, actuating items that have no planar surfaces represents a technical challenge. The end effectors described herein include a bladder with a pliable body that is able to rigidly conform to a contour of the item to be suctioned. As a result, the end effector forms and maintains an improved seal with the item, enabling items with complex shapes to be manipulated at greater velocities and/or accelerations without loss of suction. Additionally, because material disposed within the pliable body is used to conform the pliable body to the contour of the item, any contact force that might be required to conform the pliable body to the contour is minimal, diminishing a likelihood of damage to the item.

According to one or more embodiments described herein, an end effector that is configured to actuate irregularly shaped items is disclosed. The end effector comprises a manifold and a bladder attached to the manifold. The bladder comprises a pliable body that defines an inner recess in fluid communication with the manifold via a first connection. The pliable body has a sealing surface at its distal end and an opening at its proximal end that is in fluid communication with the manifold via a second connection. The pliable body further defines a chamber. A material is disposed in the chamber. The end effector further comprises a first vacuum port in fluid communication with the first connection. The end effector further comprises a signaling port that communicates a signal to the bladder causing the bladder to transition from a first structural state to a second structural state that is more rigid than the first structural state.

In some embodiments, communicating the signal to the bladder causes a change to a composition of the material and/or a change of state of the material. In some embodiments, the material comprises a fluid and the signaling port comprises a second vacuum port. The change to the composition of the material may comprise evacuating at least part of the fluid from the chamber via the second vacuum port. In some embodiments, the material further comprises a granular material, and evacuating at least part of the fluid from the chamber causes a jamming of the granular material.

Figure 1A:
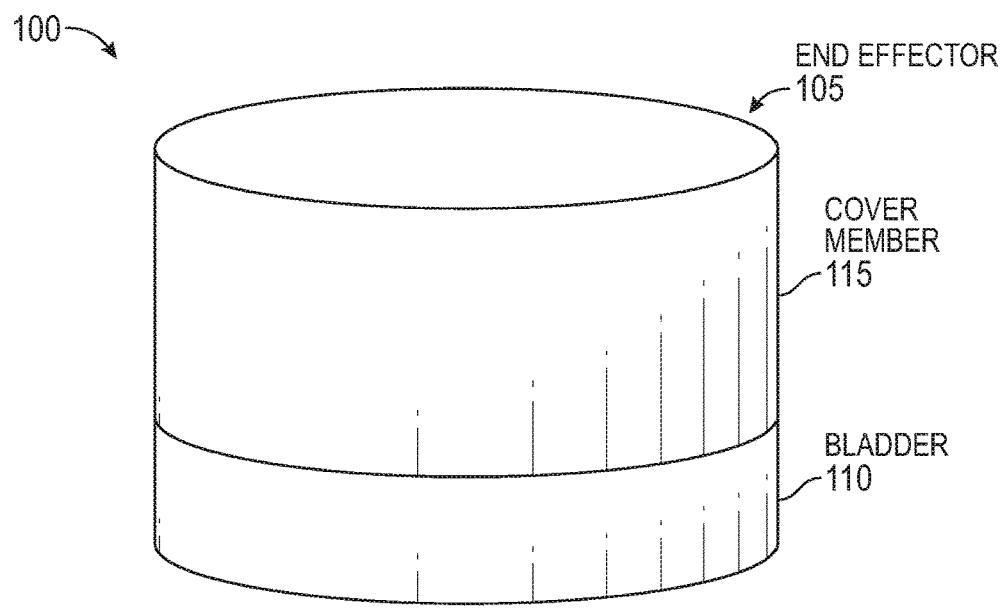
FIGS. 1A and 1B are diagrams of an exemplary end effector, according to various embodiments.
Figure 1B:
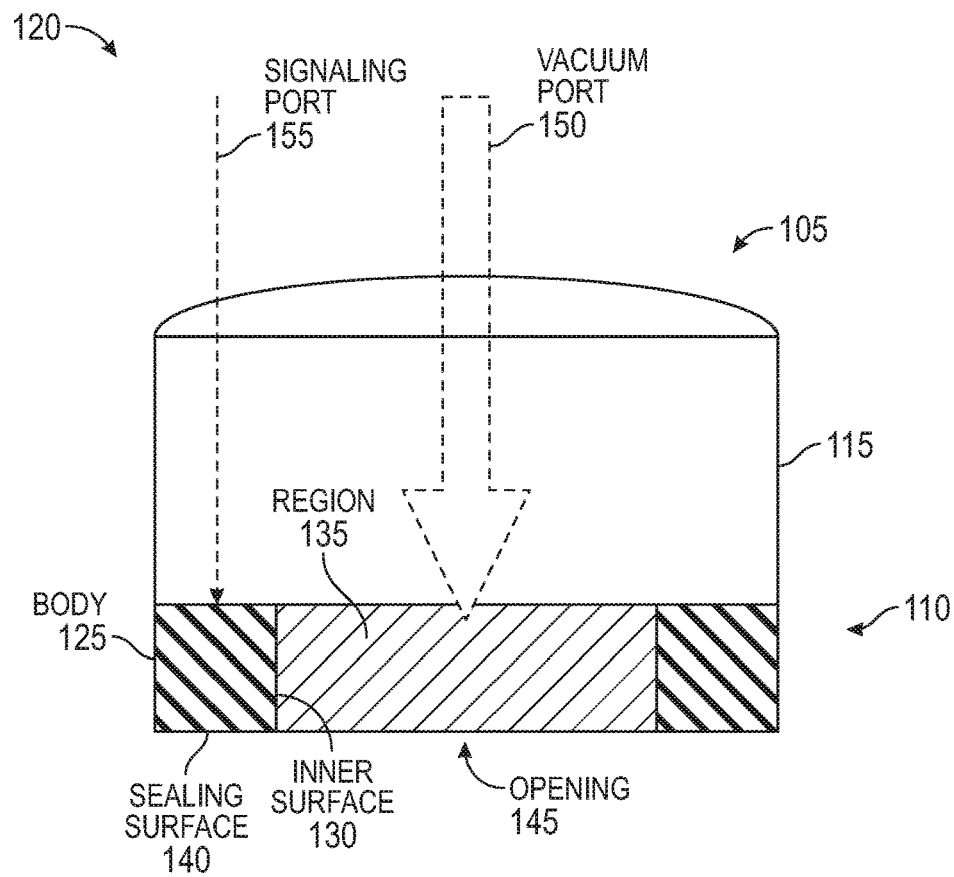

FIGS. 1A and 1B are diagrams 100, 120 of an exemplary end effector 105, according to various embodiments. More specifically, the diagram 100 represents an exterior view of the end effector 105, and the diagram 120 represents a cross-sectional view of the end effector 105. The end effector 105 may be used within an industrial automation system or any alternate environment suitable for handling items.

The end effector 105 comprises a bladder 110 connected with a manifold 115. The bladder 110 comprises a pliable body 125 (or "body") made of any suitable pliable material(s). Some non-limiting examples of pliable materials include elastomeric materials such as latex, rubber, and silicone. The pliable body 125 comprises an inner surface 130 defining a region 135 (also referred to as an "inner recess", a "central region", or a "vacuum region"). The pliable body 125 may be configured to entirely circumscribe the region 135. In some embodiments, the inner surface 130 and/or the region 135 are elliptical, such as an ellipse or a circle. When viewed from a top view, the manifold 115 and the bladder 110 have elliptical shapes that are concentric and coextensive. However, other suitable shapes, sizes, and/or non-concentric arrangements of the manifold 115 and the bladder 110 are also possible.

The pliable body 125 further comprises a sealing surface 140 at a distal end of the pliable body 125. The sealing surface 140 defines an opening 145 to the region 135. In some embodiments, bringing an item into contact with the sealing surface 140 causes the sealing surface 140 to conform to a contour of the item and thereby seals the region 135 from ambient.

The end effector 105 comprises a plurality of ports. A vacuum port 150 is in fluid communication with the region 135 and is configured to pull a vacuum in the region 135 when sealed by the sealing surface 140. A signaling port 155 is in communication with the bladder 110 and is configured to communicate signals to the bladder 110 to control a rigidity thereof. In some embodiments, the signals cause the bladder 110 to transition between a first structural state to a second structural state that is more rigid than the first structural state. As discussed herein, the terms "first structural state" and "second structural state" may refer to any of the bladder 110 and the pliable body 125.

The bladder 110 may be in the first structural state (i.e., less rigid) to allow the sealing surface 140 to conform to the item to be suctioned to the end effector 105. The bladder 110 may transition to the second structural state (i.e., more rigid) to maintain the bladder 110 in the conformed state, e.g., before and/or while the item is suctioned to the end effector 105. In this way, the bladder 110 may be maintained in the conformed state while the item is being moved, allowing the end effector 105 to maintain an improved seal with the item. As a result, heavier items and/or complex-shaped items may be manipulated by the end effector 105 at greater velocities and/or accelerations without loss of suction.

In some embodiments, the pliable body 125 defines a chamber that is partly or completely filled with a material. In some cases, the material in the chamber comprises a composition of a plurality of materials in any suitable phase(s): solid(s), liquid(s), and/or gas(es). Communicating the signals to the bladder 110 via the signaling port 155 causes one or more of: a change to a composition of the material and a change of state of the material.

In some embodiments, the chamber of the bladder 110 is partially filled with a solid and partially filled with a fluid. In such embodiments, the signaling port 155 may be a vacuum port that is configured to evacuate at least part of the fluid from the chamber to increase a rigidity of the bladder 110. In this way, evacuating at least part of the fluid acts to change the material composition in the chamber. In one non-limiting example, the solid in the chamber comprises a granular material, and the fluid comprises air. Evacuating at least part of the air from the chamber may cause a jamming of the granular material, which increases a rigidity of the bladder 110. The inventors surmise that evacuating at least part of the air from the chamber increases friction between particles of the granular material, thus making the granular material as a whole more rigid. In another non-limiting example, the solid in the chamber comprises a compressible material such as a gel or foam.

Other types of materials suitable for selectively increasing a rigidity of the bladder 110 are also contemplated. In one non-limiting example, the chamber comprises a smart fluid, such as a magnetorheological (MR) fluid, a ferrofluid, or an electrorheological (ER) fluid that is configured to change its viscosity. The MR fluid and ferrofluid are generally configured to change viscosity responsive to a magnetic field intensity. In such a case, the signaling port 155 may communicate the signals to one or more electromagnets disposed proximate to the chamber to change the magnetic field intensity. The ER fluid is generally configured to change viscosity responsive to an electric field intensity.

In some embodiments, the suction (or astrictive force) provided via the vacuum port 150 provides substantially all of the force binding the item to the end effector 105. Stated another way, in some embodiments, the amount of impactive gripping force applied by the pliable body 125 (or bladder) on the item in the second structural state is minimized. For example, when the item is suctioned to the end effector 105, the sealing surface 140 may contact a single side of the item and the pliable body 125 provides no compressive (or squeezing) force on the item. In another example, the sealing surface 140 may contact different sides of the item, but any force provided by the pliable body 125 (such as a frictional force) is negligible relative to the suction provided via the vacuum port 150. In one embodiment, the force provided by the pliable body 125 may be considered negligible when it is 5% or less of the amount of the applied suction force.

The manifold 115 may represent a continuously rigid portion of the end effector 105, and may be used to interface with other components of the industrial automation system. For example, one or more mechanical arms for spatially manipulating the end effector 105 (e.g., displacing and/or rotating) may be attached to the manifold 115. In another example, the manifold 115 may provide points of attachment to the end effector 105, e.g., such as attaching a hose to the vacuum port 150 and/or attaching a cable, hose, etc. to the signaling port 155.

Therefore, in some embodiments, the manifold 115 has a greater rigidity than the pliable body 125 when in the first structural state. The manifold 115 may also have a greater rigidity than the pliable body 125 when in the second structural state, but this is not a requirement. The manifold 115 may be formed of any suitable material(s), which may include relatively inelastic material(s) such as plastics or metals. However, in some cases, the manifold 115 may be formed of elastic material(s) and dimensioned to provide a greater rigidity than the pliable body 125 in the first structural state. In one non-limiting example, the manifold 115 may be formed of a same elastomeric material as the pliable body 125, but has a much greater thickness than walls of the pliable body 125.

The manifold 115 and the bladder 110 may be connected through any suitable means. In some embodiments, the manifold 115 and the bladder 110 are removably connected using threaded fasteners. In other embodiments, the manifold 115 and the bladder 110 are integrally formed.

Figure 2B:
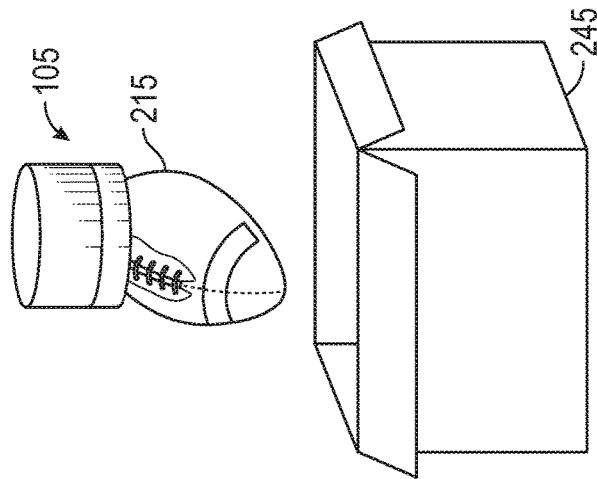
FIGS. 2A and 2B illustrate handling an item using an end effector, according to various embodiments.
Figure 2A:
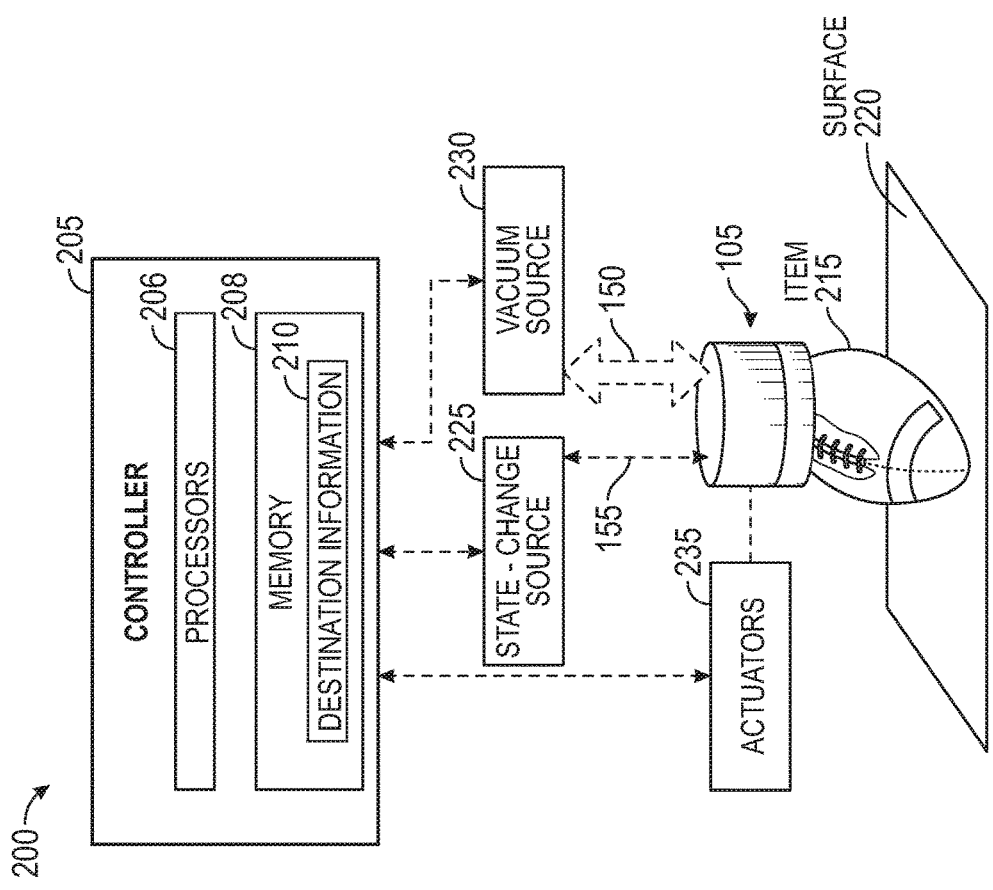

FIGS. 2A and 2B illustrate handling an item using an end effector, according to various embodiments. The features illustrated in FIGS. 2A and 2B may be used in conjunction with other embodiments, such as the end effector 105 of FIG. 1.

The diagram 200 comprises a controller 205 that is configured to interface with the end effector 105 through at least the vacuum port 150 and the signaling port 155. In some embodiments, the controller 205 is further configured to interface with the end effector 105 through one or more actuators 235 connected thereto. The one or more actuators 235 may have any suitable form, and may control the end effector 105 according to one or more degrees of freedom. Some non-limiting examples of the one or more actuators 235 comprise articulating and/or telescoping robotic arms.

The controller 205 comprises one or more computer processors 206 and a memory 208. The one or more computer processors 206 represent any number of processing elements that each can include any number of processing cores. Some non-limiting examples of the one or more computer processors 206 include a microprocessor, a digital signal processor (DSP), an application-specific integrated chip (ASIC), and a field programmable gate array (FPGA), or combinations thereof. The memory 208 may comprise volatile memory elements (such as random access memory), non-volatile memory elements (such as solid-state, magnetic, optical, or Flash-based storage), and combinations thereof. Moreover, the memory 208 may be distributed across different mediums (e.g., network storage or external hard drives).

The memory 208 may comprise a plurality of "modules" for performing various functions described herein. In one embodiment, each module includes program code that is executable by one or more of the computer processors 206. However, other embodiments may include modules that are partially or fully implemented in hardware (i.e., circuitry) or firmware of the controller 205.

In some embodiments, the memory 208 may comprise item information associated with the different items in the environment, which may include destination information 210 associated with the items. The destination information 210 may have any suitable form, such as a destination within the warehouse (e.g., a particular container or a particular environment location), a destination external to the warehouse (e.g., a portion of a destination mailing address or a particular vehicle for external transport), and so forth. In some embodiments, the controller 205 acquires the destination information 210 from one or more computing devices that are networked with the controller 205.

Although not shown, the controller 205 may be communicatively coupled with one or more sensors in the environment. In one non-limiting example, the controller 205 acquires imagery using one or more visual sensors. The one or more computer processors 206 may process the imagery to locate and/or identify the item 215, and/or to determine a positioning and/or orientation of the end effector 105 relative to the item 215.

In some embodiments, the controller 205 is configured to transmit control signals to the one or more actuators 235 to provide the end effector 105 with a desired positioning and/or orientation for contacting and/or handling the item 215. In the diagram 200, the end effector 105 has been brought into contact with the item 215 resting on a surface 220. The controller 205 may further transmit control signals to the one or more actuators to displace the end effector 105 and the suctioned item 215 to a predefined location, which in some cases may be specified by the destination information 210. In some alternate embodiments, the end effector 105 and/or the item 215 may be manually moved to provide the contacting relationship, and/or to displace the end effector and the suctioned item 215 to the predefined location. For example, the end effector 105 may include a handle allowing a user to rotate and/or displace the end effector 105.

In some embodiments, the controller 205 is configured to transmit control signals to a vacuum source 230 to selectively pull a vacuum on the vacuum region of the end effector 105. The vacuum source 230 may have any suitable implementation, such as a vacuum pump connected to the vacuum port 150 via a flexible hose. Pulling the vacuum on the vacuum region operates to suction the item 215 to the end effector 105. In some embodiments, the controller 205 transmits control signals to the vacuum source 230 to release the vacuum when the item 215 is at the predefined location.

The controller 205 is further configured to transmit control signals to a state-change source 225 to control a rigidity of a bladder of the end effector 105. In one non-limiting example, the state-change source 225 comprises a second vacuum source and the signaling port 155 comprises a second vacuum port in fluid communication with the bladder. In another non-limiting example, the state-change source 225 comprises one or more electromagnets configured to generate a magnetic field across the bladder with a desired intensity.

Figure 3:
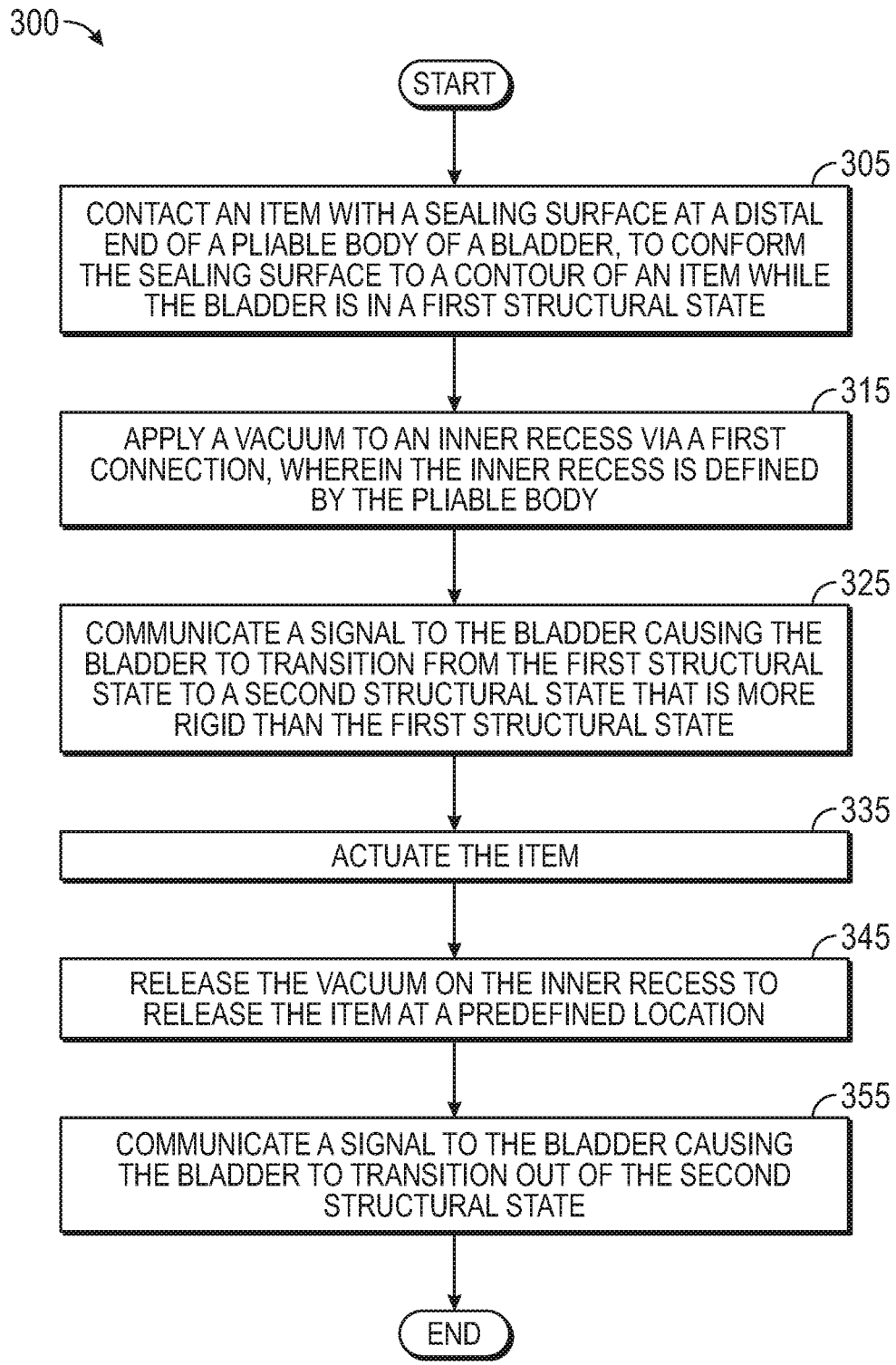
FIG. 3 illustrates an exemplary method of handling items using an end effector, according to various embodiments.
Figure 4A:
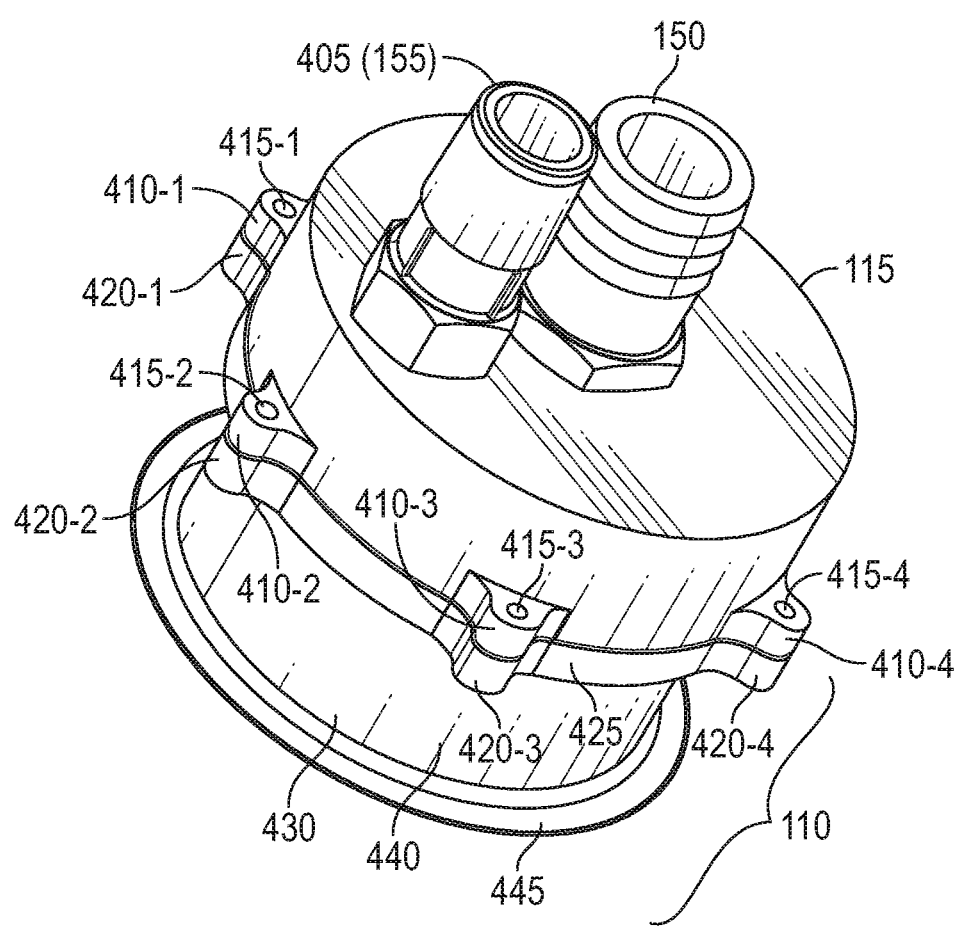
FIGS. 4A-4D are views of an end effector with two vacuum ports, according to various embodiments.
Figure 4B:
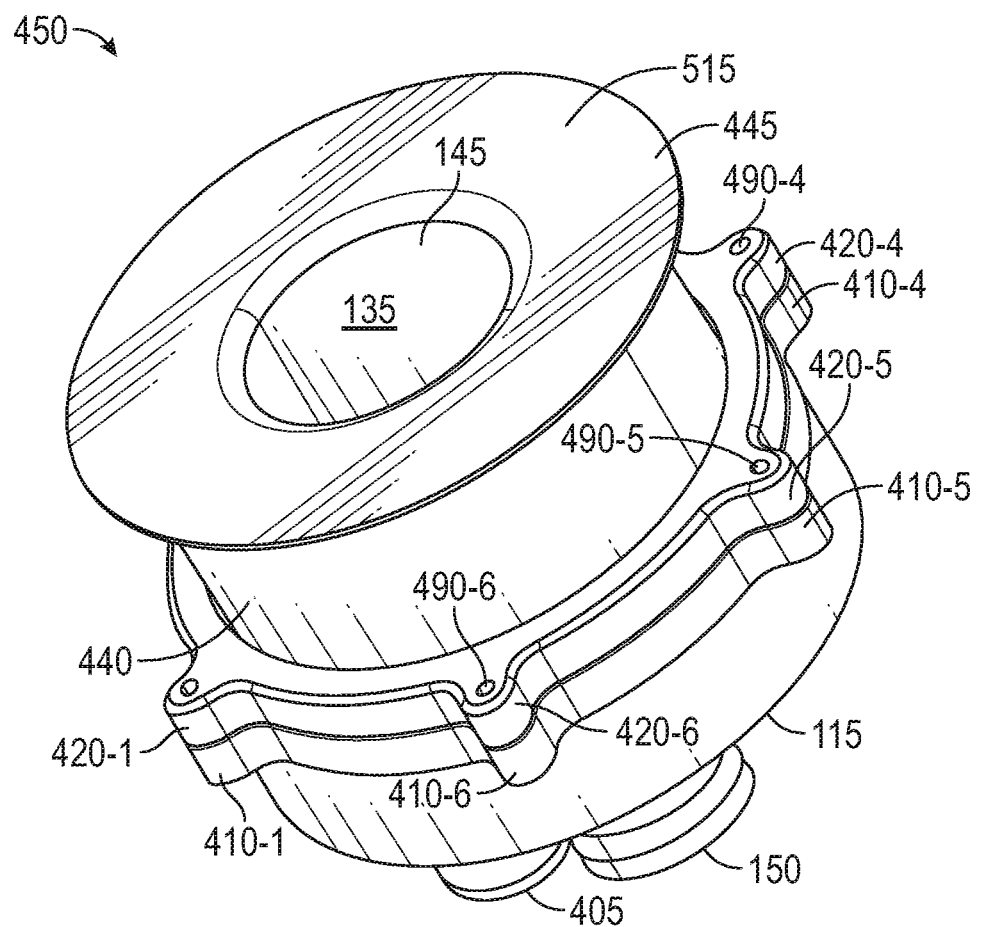
Figure 4C:
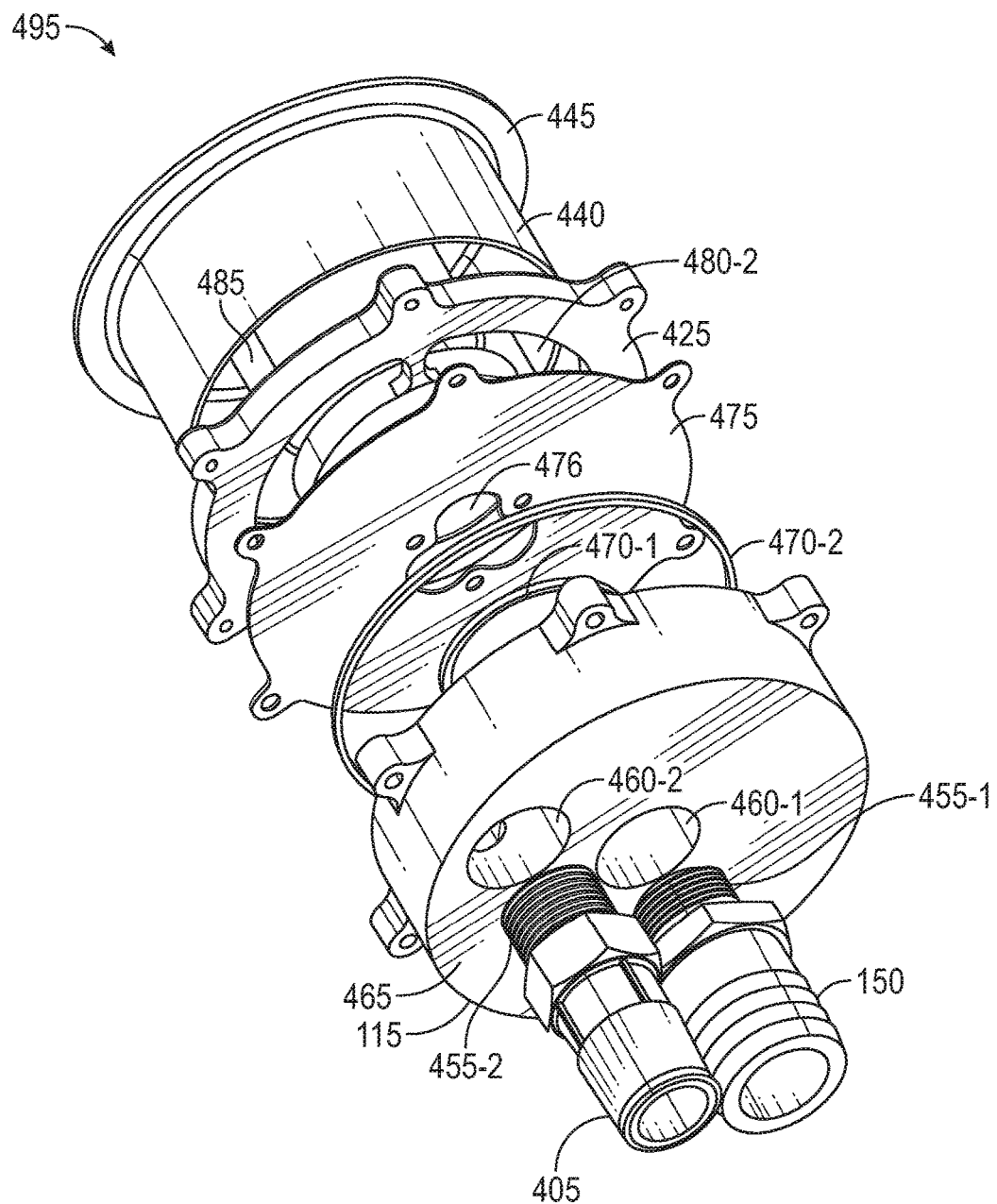
Figure 4D:
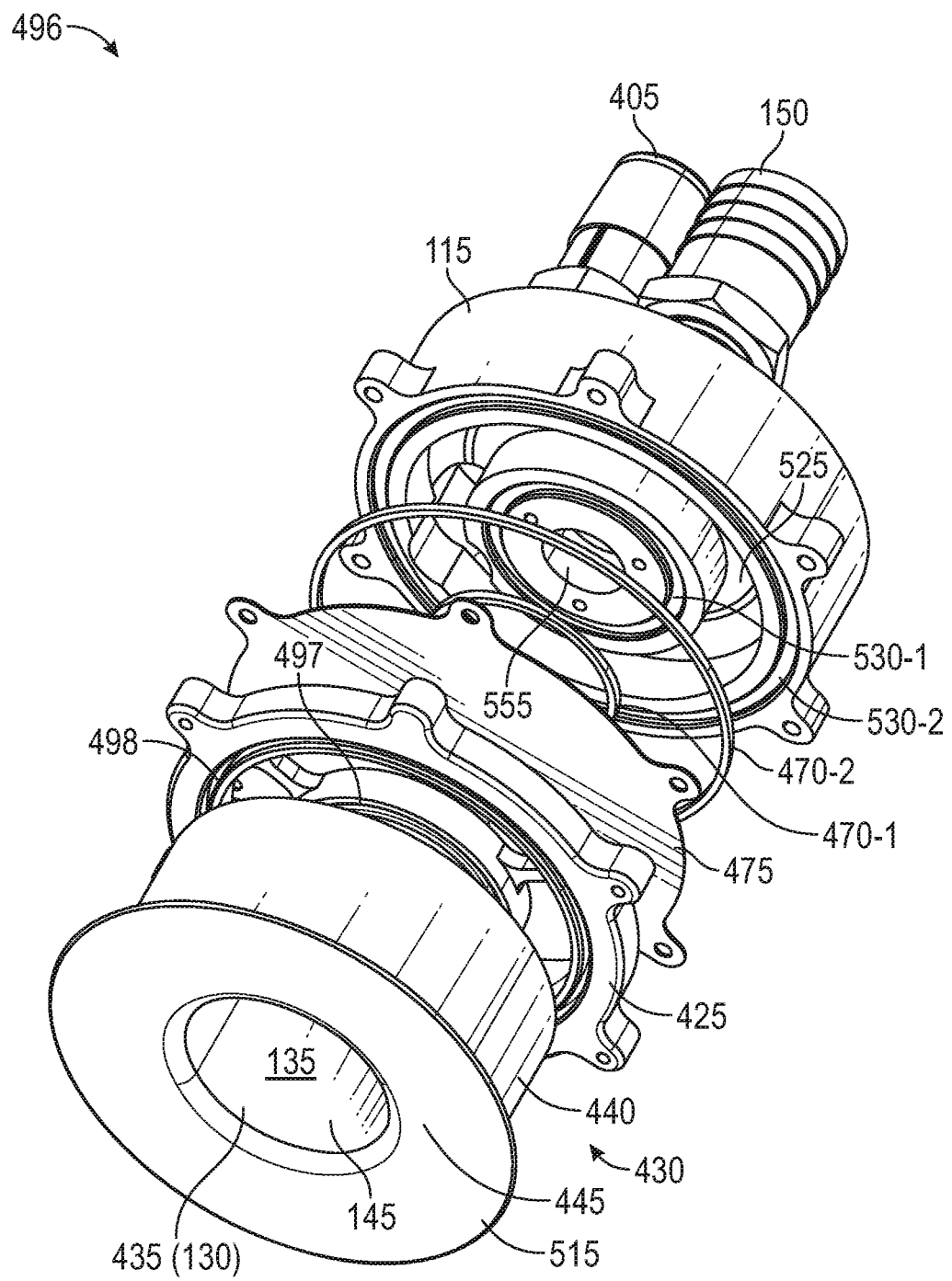

Next, method 300 of FIG. 3 will be described with reference to FIGS. 2A and 2B. The method 300 begins at block 305, where an item 215 is contacted with a sealing surface at a distal end of a pliable body of a bladder, to conform the sealing surface to a contour of the item 215 while the bladder is in a first structural state. In some cases, conforming the sealing surface to the contour of the item 215 seals an inner recess of the pliable body from ambient. In some embodiments, the controller 205 communicates signals to the one or more actuators 235 to move the end effector 105 to contact the item 215.

At block 315, the controller 205 communicates a signal to the vacuum source 230 to apply a vacuum to an inner recess via a first connection. The inner recess is defined by the pliable body. In some cases, applying the vacuum the first vacuum port 150 to suction the item 215 to the bladder. At block 325, the controller 205 communicates a signal to the bladder causing the bladder to transition from the first structural state to a second structural state that is more rigid than the first structural state. In some embodiments, the signal is provided to a state-change source 225 (e.g., a second vacuum pump, one or more electromagnets) that is communicatively coupled with the bladder via the signaling port 155. In some embodiments, transitioning the bladder to the second structural state occurs while the item 215 is suctioned to the bladder. In other embodiments, transitioning the bladder to the second structural state occurs before the item 215 is suctioned to the bladder.

At block 335, the controller 205 communicates a signal to one or more actuators 235 to actuate the item 215. In some cases, actuating the item 215 comprises displacing the end effector 105 and the item 215 suctioned to the bladder. By increasing the rigidity of the bladder, the bladder is maintained in the conformed state and provides an improved seal with the item 215 while the item 215 is being actuated. The improved seal may allow heavier items and complex-shaped items to be manipulated at greater velocities and/or accelerations without loss of suction.

At block 345, the controller 205 communicates a signal to the vacuum source 230 to release the vacuum on the inner recess to release the item 215 at a predefined location. In some embodiments, the predefined location corresponds to destination information 210 associated with the item 215. For example, the destination information 210 may indicate that the item 215 is destined for a container 245. Responsive to determining that the end effector 105 has moved the item 215 to a position above the container 245, the controller 205 causes the vacuum to be released, which causes the item 215 to be released into the container 245.

At block 355, the controller 205 communicates a signal to the bladder causing the bladder to transition out of the second structural state. In some embodiments, a rigidity of the bladder may be decreased responsive to the signal. For example, the bladder may be returned into the first structural state, such that the end effector 105 is ready to contact and/or handle another item. In some embodiments, transitioning the bladder out of the second structural state occurs after the vacuum on the central region has been released. In other embodiments, transitioning the bladder out of the second structural state may be at least partly overlapping in time with releasing the vacuum. The method 300 ends after completion of block 355.

FIGS. 4A-4D are views of an end effector with two vacuum ports, according to various embodiments. More specifically, diagrams 400, 450 represent exterior views of the end effector 105, and the diagrams 495, 496 represent exploded views of the end effector 105. The features described with respect to diagrams 400, 450, 495, 496 may be used in conjunction with other embodiments described herein.

The manifold 115 defines a plurality of openings 460-1, 460-2 from a top surface 465 thereof. The openings 460-1, 460-2 are dimensioned to receive a respective threaded portion 455-1, 455-2 of a respective vacuum port 150, 405. The vacuum port 405 represents one example of the signaling port 155 described above. The vacuum port 150 and/or the vacuum port 405 may be connected to the manifold 115 in any suitable manner. For example, the vacuum ports 150, 405 may be integrally formed with the manifold 115.

The openings 460-1, 460-2 may extend partly or fully through the manifold 115, such that the vacuum ports 150, 405 are in fluid communication with respective portions of the bladder 110 via the openings 460-1, 460-2. For example, the vacuum port 150 may be in fluid communication with a central region 135 defined by the bladder 110, and the vacuum port 405 may be in fluid communication with a chamber 485 defined by the bladder 110.

The bladder 110 comprises a base portion 425 and a walled portion 430 that extends from the base portion 425. The base portion 425 is dimensioned to connect the bladder 110 with the manifold 115. In some embodiments, the base portion 425 and the walled portion 430 are separate components that may be connected to each other. For example, the base portion 425 may define a plurality of grooves 497, 498 each configured to receive part of the walled portion 430. The base portion 425 and the walled portion 430 may be attached using any suitable means, such as bonded using an adhesive. In other embodiments, the base portion 425 and the walled portion 430 may be integrally formed.

The walled portion 430 comprises an inner wall 435 that defines the central region 135, and an outer wall 440 disposed around the inner wall 435. In some embodiments, the inner wall 435 is received partly into the groove 497, and the outer wall 440 is received partly into the groove 498. Although not shown, the walled portion 430 may further comprise a surface section extending between the inner wall 435 and the outer wall 440. A rim section 445 may extend outwardly from the outer wall 440. The surface section and the rim section 445 may provide the sealing surface of the end effector 105, which is discussed above with respect to FIG. 1.

Figure 7A:
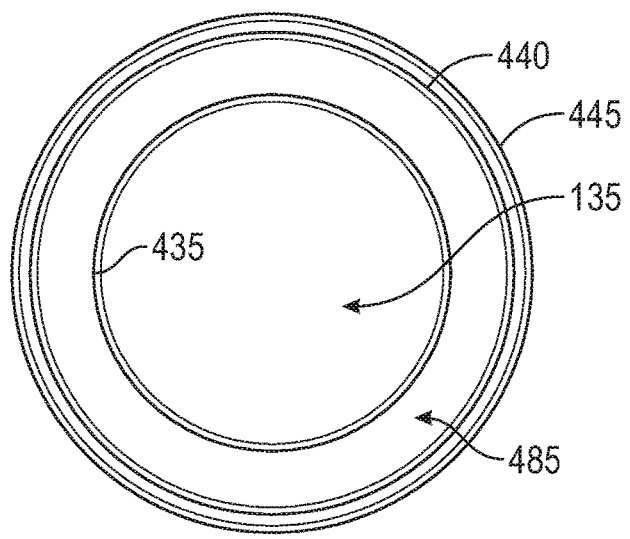
FIGS. 7A and 7B illustrate a chamber and a vacuum region of a bladder, according to various embodiments.
Figure 7B:
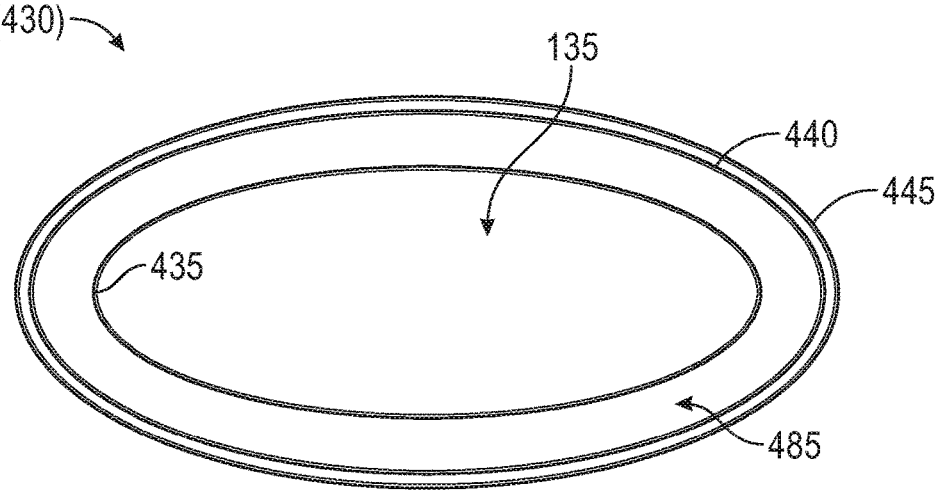

Referring now to FIGS. 7A and 7B, diagrams 700, 710 illustrate the chamber 485 and a vacuum region 135 of a bladder, according to various embodiments. More specifically, the diagram 700 provides a top view of the walled portion 430 in which the inner wall 435, the outer wall 440 and the rim section 445 each have a circular shape and are concentrically arranged. The diagram 710 provides a top view of the walled portion 430 in which the inner wall 435, the outer wall 440 and the rim section 445 each have an ellipse shape and are concentrically arranged. Notably, the ellipse shapes illustrated in the diagram 710 may be particularly well-suited for handling elongated items, such as book spines. More specifically, aligning the long axis of an elongated item with the semi-major axis of the ellipse shapes may allow a better seal to be formed and maintained by the end effector 105. As a result, less suction force may be required to suction the elongated item to the end effector 105, which corresponds to a reduced probability of damage to the elongated item.

As discussed above, in some embodiments, the end effector 105 may increase a rigidity of the bladder after a vacuum has been pulled on the central region 135 and the item has already been suctioned to the end effector 105. However, in other embodiments, the rigidity of the bladder may be increased after the sealing surface has conformed to a contour of the item and before the vacuum is pulled on the central region 135. As mentioned above, this sequence may be particularly beneficial for items that are more susceptible to damage, as a lower amount of suction force may be required to suction the items to the end effector 105.

While the diagrams 700, 710 illustrate elliptical shapes such as circles and ellipses, other shapes of the inner wall 435, the outer wall 440, and/or the rim section 445 are also possible. Generally, shapes with rounded corners (e.g., oval, stadium, rounded rectangle, rounded hexagon) may be preferable, as non-rounded corners may be more prone to wear for repeated cycling of the pliable bladder. However, shapes with non-rounded corners (e.g., rectangle, triangle, hexagon) are also contemplated. Further, in some cases the inner wall 435, the outer wall 440, and/or the rim section 445 may have differing shapes, and/or may have a non-concentric arrangement.

Returning now to FIGS. 4A and 4B, in some embodiments, the base portion 425 has a greater rigidity than the walled portion 430. In one non-limiting example, the base portion 425 is formed of relatively inelastic material(s) such as plastics or metals, and the walled portion 430 is formed of an elastomeric material. In another non-limiting example, the base portion 425 is formed of a same elastomeric material as the walled portion, but has a much greater thickness than an inner wall 435 and/or an outer wall 440 of the walled portion 430.

A plurality of openings 480-1, 480-2 may extend partly or fully through the base portion 425, such that the vacuum port 150 is in fluid communication with the central region 135 via the opening 480-1, and the vacuum port 405 is in fluid communication with the chamber 485 via the opening 480-2. As shown, the opening 480-1 has an elliptical shape and the opening 480-2 has a annular shape that at least partly circumscribes the opening 480-1. The openings 480-1, 480-2 may be concentrically arranged, but this is not a requirement. Further, the openings 480-1, 480-2 may have any alternate shapes, dimensions, and/or arrangements suitable for providing fluid communication through the base portion 425 to respective portions of the bladder 110. For example, one alternate implementation of the base portion 425 may have an opening 480-2 that is elliptical and that does not circumscribe the opening 480-1.

In some embodiments, a filter 475 may be disposed between the chamber 485 and the opening 460-2 in the manifold 115. The filter 475 is configured to allow certain material to pass therethrough, while retaining other material in the chamber 485. In one non-limiting example, the chamber 485 may be partly filled with a granular material and partly filled with air. The filter 475 may have a pore size selected such that all (or nearly all) of the granular material is retained in the chamber 485, while the air may be evacuated through the filter 475.

The filter 475 is shown as having an annular shape sized to overlap with the opening 480-2. The filter 475 defines an opening 476 that allows an opening 555 in the manifold 115 to remain in fluid communication with an opening 480-1 of the base portion 425. Although not discussed in detail, the filter 475 may comprise additional openings for receiving fasteners or other features therethrough to provide the filter 475 with a suitable alignment relative to the manifold 115 and/or the base member 425. However, different sizes and shapes of the filter 475 are also possible consistent with the configuration of the opening 480-2. Further, while the filter 475 is shown between the manifold 115 and the base portion 425, alternate implementations may include the filter 475 at a different location that is further upstream (i.e., closer to a vacuum source) or further downstream (i.e., further from the vacuum source). Some examples of upstream positions include within the manifold 115, within the vacuum port 405, and within a hose connecting the vacuum port 405 with a vacuum source. Some examples of a downstream position include within the base portion 425 and within the bladder 110.

A gasket 470-1 may be arranged between the opening 480-1 and the opening 480-2 of the base portion 425 to ensure fluidic isolation between the center region 135 and the chamber 485. Similarly, a gasket 470-2 may be arranged between the opening 480-2 and the perimeter of the manifold 115 to ensure fluidic isolation between the chamber 485 and ambient. The gaskets 470-1, 470-2 may be made of any suitable material, such as rubber or silicone. In some embodiments, the gaskets 470-1, 470-2 are arranged in grooves 530-1, 530-2 that are formed into the manifold 115.

The manifold 115 comprises a plurality of tabs 410-1, 410-2, 410-3, 410-4, 410-5, 410-6 extending from and spaced along a perimeter of the manifold 115. Each of the tabs 410-1, . . . , 410-6 has a respective opening 415-1, 415-2, 415-3, 415-4, 415-5, 415-6 extending therethrough. The base portion 425 comprises a plurality of tabs 420-1, 420-2, 420-3, 420-4, 420-5, 420-6 extending from and spaced along a perimeter of the base portion 425. Each of the tabs 420-1, . . . , 420-6 has a respective opening 490-1, 490-2, 490-3, 490-4, 490-5, 490-6 extending at least partly therethrough. The openings 490-1, . . . , 490-6 of the tabs 420-1, . . . , 420-6 are dimensioned and spaced to register with respective openings 415-1, . . . , 415-6 of the tabs 410-1, . . . , 410-6. In some embodiments, threaded fasteners such as bolts or screws may be inserted through pairs of the registered openings 490-1 and 415-1, 490-2 and 415-2, and so forth to connect the bladder 110 with the manifold 115.

The base portion 425 includes a same number of the openings 490-1, . . . , 490-6 as the number of the openings 415-1, . . . , 415-6 of the manifold 115. As shown, the openings of the manifold 115 correspond to the openings of the base portion 425 in a 1:1 ratio, although other ratios are possible. In an alternate embodiment, the manifold 115 and the base portion 425 may have a different number of openings. Stated another way, the openings of the manifold 115 may correspond to the openings of the base portion 425 in another ratio, such as 2:1, 3:2, and so forth.

Further, in alternate implementations, at least one of the base portion 425 and the manifold 115 do not include the outwardly-extending tabs. Instead, the corresponding openings for receiving fasteners may be formed at locations within the perimeter of the base portion 245 and/or the manifold 115.

Figure 5A:
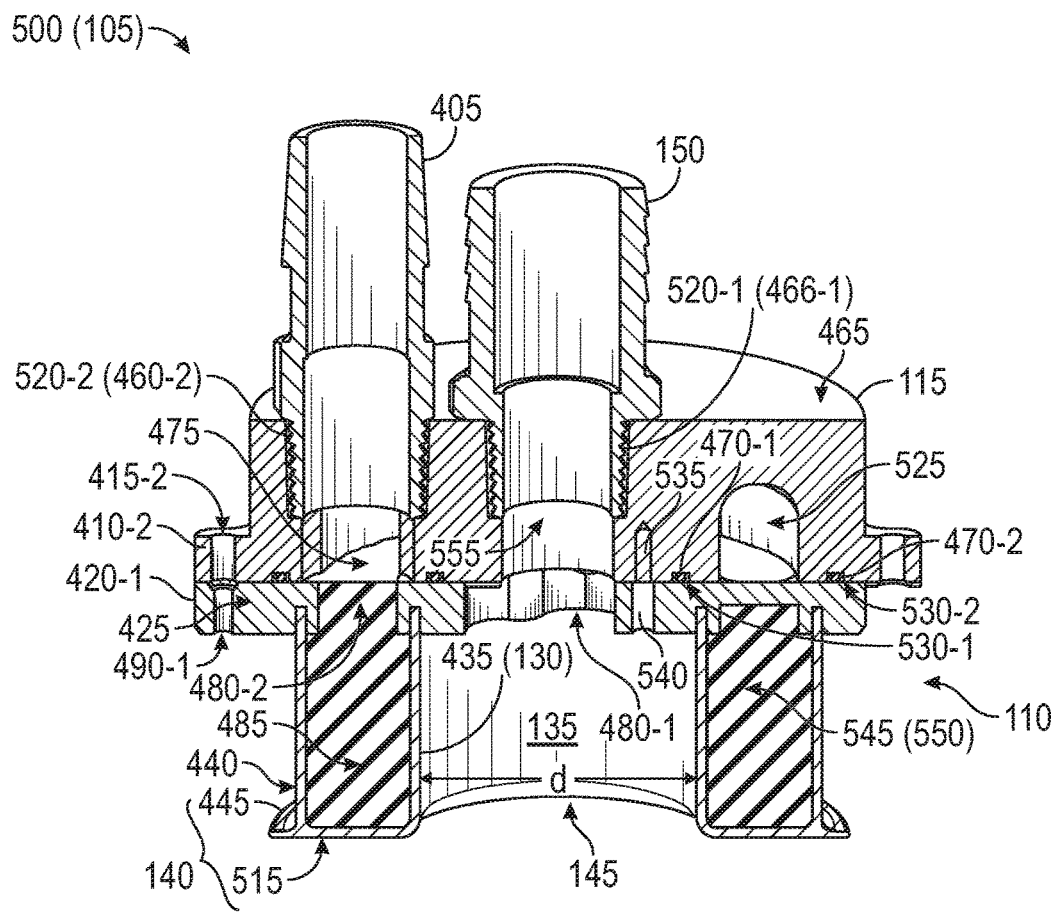
FIGS. 5A and 5B illustrate exemplary structural states of a pliable bladder, according to various embodiments.
Figure 5B:
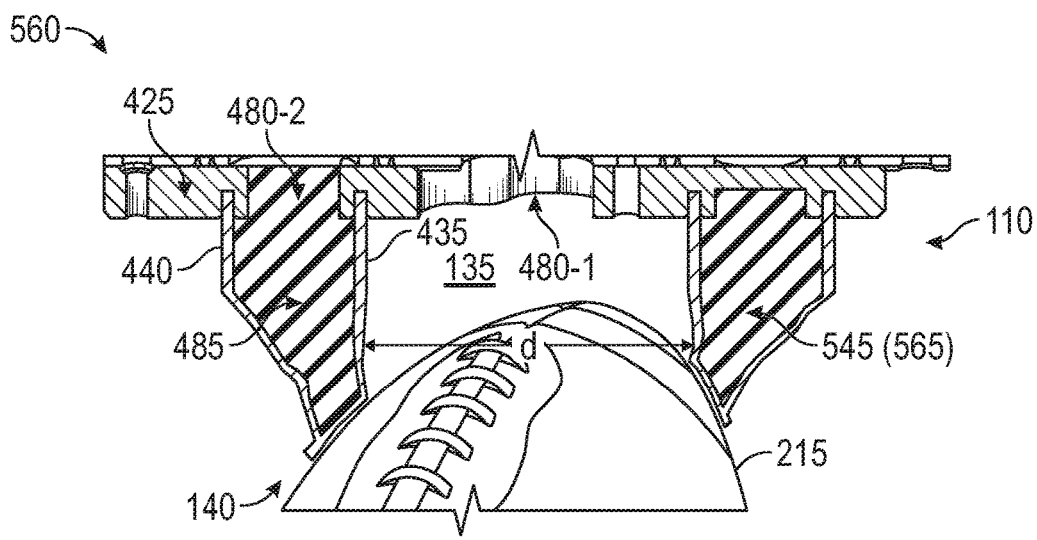

FIGS. 5A and 5B illustrate exemplary structural states of a pliable bladder 110, according to various embodiments. More specifically, diagram 500 illustrates a cross-sectional view of the end effector 105 in which the bladder 110 is in a first structural state 550, and diagram 560 illustrates a cross-sectional view of a portion of the end effector 105 in which the bladder 110 is in a second structural state 565 with a greater rigidity than the first structural state. The features described with respect to the diagrams 500, 560 may be used in conjunction with other embodiments described herein.

In the diagram 500, the manifold 115 defines a threaded socket 520-1 in the opening 460-1, and a threaded socket 520-2 of the opening 460-2. The threaded socket 520-1 is configured to mate with the threaded portion 455-1 of the vacuum port 150, and the threaded socket 520-2 is configured to mate with the threaded portion 455-2 of the vacuum port 405.

The manifold 115 further defines a plurality of grooves 530-1, 530-2 configured to receive a respective gasket 470-1, 470-2. The manifold 115 further defines a chamber 525 that is in fluid communication with the vacuum port 405 and with the chamber 485. As shown, the chamber 525 has a annular shape, but other shapes and sizes of the chamber 525 are also possible. The manifold 115 further defines a chamber 555 that is in fluid communication with the vacuum port 150 and with the inner recess 135 through the opening 480-1.

The manifold 115 further defines an opening 535 configured to receive a fastener. As discussed above, when the manifold 115 is aligned with the base portion 425, the openings 490-1, 415-2 of respective tabs 420-1, 410-2 are registered. In this arrangement, the opening 535 is registered with an opening 540 extending through the base portion 425. In some embodiments, threaded fasteners such as bolts or screws may be inserted through the registered openings 535, 540 to connect the bladder 110 with the manifold 115.

The bladder 110 comprises a surface portion 515 extending between the inner wall 435 and the outer wall 440. The surface portion 515 and the rim section 445 may provide the sealing surface 140 of the end effector 105, which is discussed above with respect to FIG. 1.

The chamber 485 comprises a material composition 545, which may include one or more materials in any suitable phase(s)—solid(s), liquid(s), and/or gas(es). As mentioned above with respect to FIG. 1, communicating a signal to the bladder 110 via the signaling port causes one or more of a change to the material composition 545 and a change of state of a first material. In the diagram 500, the vacuum port 405 represents one example of the signaling port.

In some embodiments, the chamber 485 is partially filled with a solid and partially filled with a fluid. In such embodiments, the vacuum port 405 is configured to evacuate at least part of the fluid from the chamber to increase a rigidity of the bladder 110 and transition to the second structural state. In this way, evacuating at least part of the fluid acts to change the material composition 545 in the chamber 485.

In one non-limiting example, the solid in the chamber 485 comprises a granular material, and the fluid comprises air. Evacuating at least part of the air from the chamber 485 may cause a jamming of the granular material, which increases a rigidity of the bladder 110. The granular material may comprise any suitable material(s) having desired sizing and interaction characteristics. In some embodiments, a granule size of the granular material is between about 200 microns and about 2000 microns. Generally, a granular material having relatively low friction interactions may be preferable to one having higher friction interactions, as individual granules of the granular material and/or the surrounding portions of the chamber 485 (e.g., the inner wall 435, the outer wall 440, the surface portion 515) tend to wear more slowly. Specifically, ideal granular materials have low intergranule friction in ambient pressure and high inter-granule friction under vacuum pressure. Some non-limiting examples of the granular material include charcoal, activated carbon, salt, sugar, and sand. Further, in some cases, coating layer(s) may be applied to individual granules to provide desired characteristics, such as increased hardness, reduced friction, and so forth. Still further, while the example discusses atmospheric air as the fluid in the chamber 485, other types of fluids may also be suitable, such as elemental gases, gas mixtures, and liquids.

In another non-limiting example, the solid in the chamber 485 comprises a compressible material such as a gel or foam, and evacuating at least part of the fluid causes a compression of the compressible material and an increased rigidity of the bladder 110. For example, the compressible material may be a cellular silicone or a silicone gel.

In some embodiments, the bladder 110 may have a different rigidity at various points between the proximal end and the distal end. In one embodiment, different portions of the chamber 485 may comprise different material compositions. For example, a first portion of the chamber 485 near the distal end of the bladder 110 may comprise a first compressible material that is more pliable to allow the sealing surface 140 to conform, while a second portion of the chamber comprises a second compressible material that is more rigid. In another embodiment, the inner wall 435 and/or the outer wall 440 may be dimensioned differently at various points. For example, the inner wall 435 may have a smaller thickness near the distal end of the bladder 110 to be more pliable, and may have a larger thickness away from the distal end to be more rigid.

Figure 8:
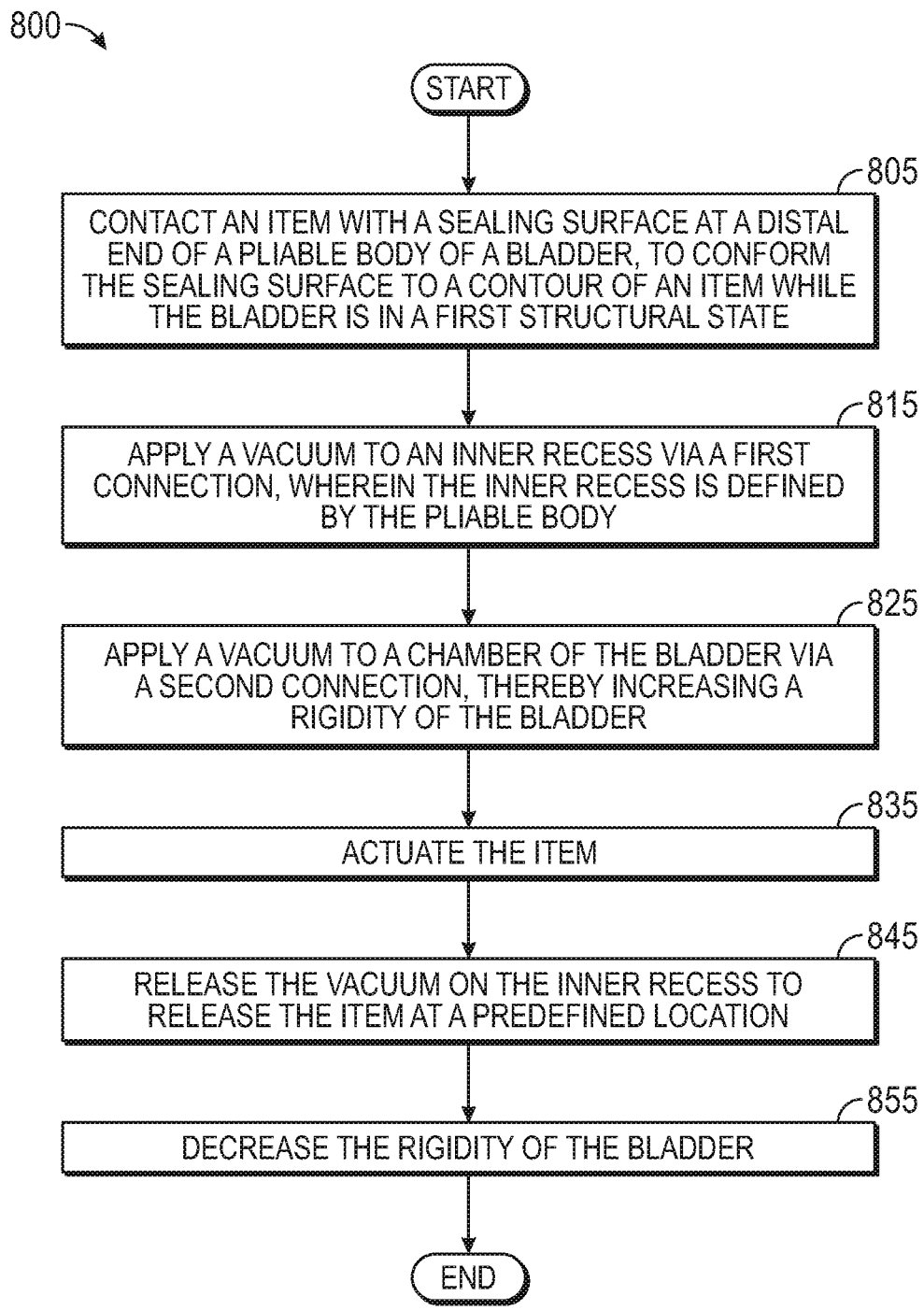
FIG. 8 illustrates an exemplary method of handling items using an end effector comprising a pliable bladder, according to various embodiments.

Next, method 800 of FIG. 8 will be described with reference to FIGS. 5A and 5B. The method 800 begins at block 805, where an item 215 contacts with a sealing surface 140 at a distal end of a pliable body of a bladder 110 to conform the sealing surface 140 to a contour of the item 215 while the bladder is in a first structural state. In some cases, conforming the sealing surface 140 operates to seal a central region 135 from ambient. In some embodiments, a controller (e.g., controller 205 of FIG. 2) communicates signals to one or more actuators (e.g., actuators 235 of FIG. 2) to move the end effector 105 to contact the item 215.

In some embodiments, a diameter d of the opening 145 is substantially unchanged when the bladder 110 transitions from the first structural state 550 to the second structural state 565. In some embodiments, the inner wall 435 is dimensioned (e.g., a thickness) to be sufficiently rigid to maintain the same diameter d at the opening 145. In other embodiments, the end effector 105 further comprises a spring disposed within the central region 135, and the spring may provide additional rigidity to maintain the same diameter d at the opening 145. The spring is configured to oppose motion into the central region 135 of the item 215 seated on the sealing surface 140.

At block 815, a vacuum is applied to the inner recess 135 via a first connection. The inner recess 135 is defined by the pliable body. In some embodiments, a vacuum source pulls the vacuum via the first vacuum port 150 to suction the item 215 to the bladder 110. At block 825, a vacuum is applied to the chamber 485 via a second connection to increase a rigidity of the bladder 110. In some embodiments, a vacuum source pulls the vacuum via the second vacuum port 405 to evacuate at least part of a fluid partially filing the chamber 485 and transitioning the pliable body to a structural state having greater rigidity. In some embodiments, rigidity of the bladder 110 is increased due to jamming of a granular material in the chamber. In some embodiments, transitioning the bladder 100 to the structural state having greater rigidity occurs while the item 215 is suctioned to the bladder 110. In other embodiments, transitioning the bladder 110 to the structural state having greater rigidity occurs before the item 215 is suctioned to the bladder 110.

At block 835, the item 215 is actuated. In some embodiments, the controller communicates a signal to one or more actuators to displace the end effector 105 and the item 215 suctioned to the bladder 110. By increasing the rigidity of the bladder 110, the bladder 110 is maintained in the conformed state and provides an improved seal with the item 215 while the item 215 is being displaced. The improved seal may allow heavier items and complex-shaped items to be manipulated at greater velocities and/or accelerations without loss of suction.

Example test results using an implementation of the end effector 105 are provided in Table 1 below. The values represent an amount of force (e.g., inertial force) required to separate a suctioned item from an end effector. Generally, larger values reflect a higher quality seal by the end effector and an ability to withstand greater inertial forces. Two different items were used: a cube-shaped item having a length of 110 millimeters (mm) and a mass of 3 kilograms (kg), and a cylinder-shaped item having a radius of 75 mm, a length of 80 mm, and a mass of 3 kg. The end effector 105 has an inner diameter d of 40 millimeters (mm) and an outer diameter of 88 mm. The end effector 105 was suctioned to a top surface of the cube-shaped item, and to a round surface of the cylinder-shaped item. The results are compared with a conventional foam suction cup having an inner diameter of 55 mm and an outer diameter of 80 mm.

TABLE 1

|  | Cube | Cylinder (Force on Flat Side) | Cylinder (Force on Round Side) |
| --- | --- | --- | --- |
| Foam Suction Cup | 12.00 lbf | 4.05 lbf | 2.25 lbf |
| End effector (first structural state) | 3.80 lbf | 3.40 lbf | 2.60 lbf |
| End effector (second structural state) | 7.95 lbf | 7.10 lbf | 10.40 lbf |

As shown in Table 1, the conventional foam suction cup performs relatively well for the cube-shaped item but not as well for the cylinder-shaped item. The end effector 105 consistently performs better than the conventional foam suction cup when in the second structural state (i.e., where the bladder 110 has a greater rigidity).

The end effector 105 may include other features to increase its ability to withstand greater inertial forces. In some embodiments, one or more portions of the end effector 105 may perform mechanical damping of the inertial forces. For example, the base portion 425 or another layer (e.g., between the base portion 425 and the manifold 115) may be dimensioned to provide mechanical damping.

Continuing the method 800, at block 845, the controller communicates a signal to the vacuum source to release the vacuum on the inner recess 135 to release the item 215 at a predefined location. In some embodiments, the predefined location corresponds to destination information (e.g., destination information 210 of FIG. 2) associated with the item 215.

At block 855, the controller communicates a signal to the bladder 110 to decrease the rigidity of the bladder 110. For example, the bladder 110 may be returned into a structural state in which the end effector 105 is ready to contact and/or handle another item. In some embodiments, decreasing the rigidity of the pliable body occurs after the vacuum on the central region 135 has been released. In other embodiments, decreasing the rigidity of the pliable body may be at least partly overlapping in time with releasing the vacuum. The method 800 ends after completion of block 855.

In one alternate embodiment, the chamber 485 comprises a magnetorheological (MR) fluid that is configured to change its viscosity responsive to magnetic field intensity. Control signals may be provided to one or more electromagnets disposed proximate to the chamber 485 to change the magnetic field intensity and thus the viscosity of the MR fluid. In some cases, responsive to a change in magnetic field intensity, the MR fluid may be transitioned from a liquid phase in the first structural state 550 to a viscoelastic solid phase in the second structural state 565. In some cases, a volume of the MR fluid in the chamber 485 may change when transitioning between the first structural state 550 and the second structural state 565. For example, the chamber 485 may be filled with the MR fluid, and conforming the sealing surface 140 to the item 215 causes a portion of the MR fluid to exit the chamber 485. In another example, a vacuum source may evacuate a portion of the MR fluid to control a volume of the chamber 485. Other types or combinations of materials suitable for selectively increasing a rigidity of the bladder 110 are also contemplated.

Figure 6:
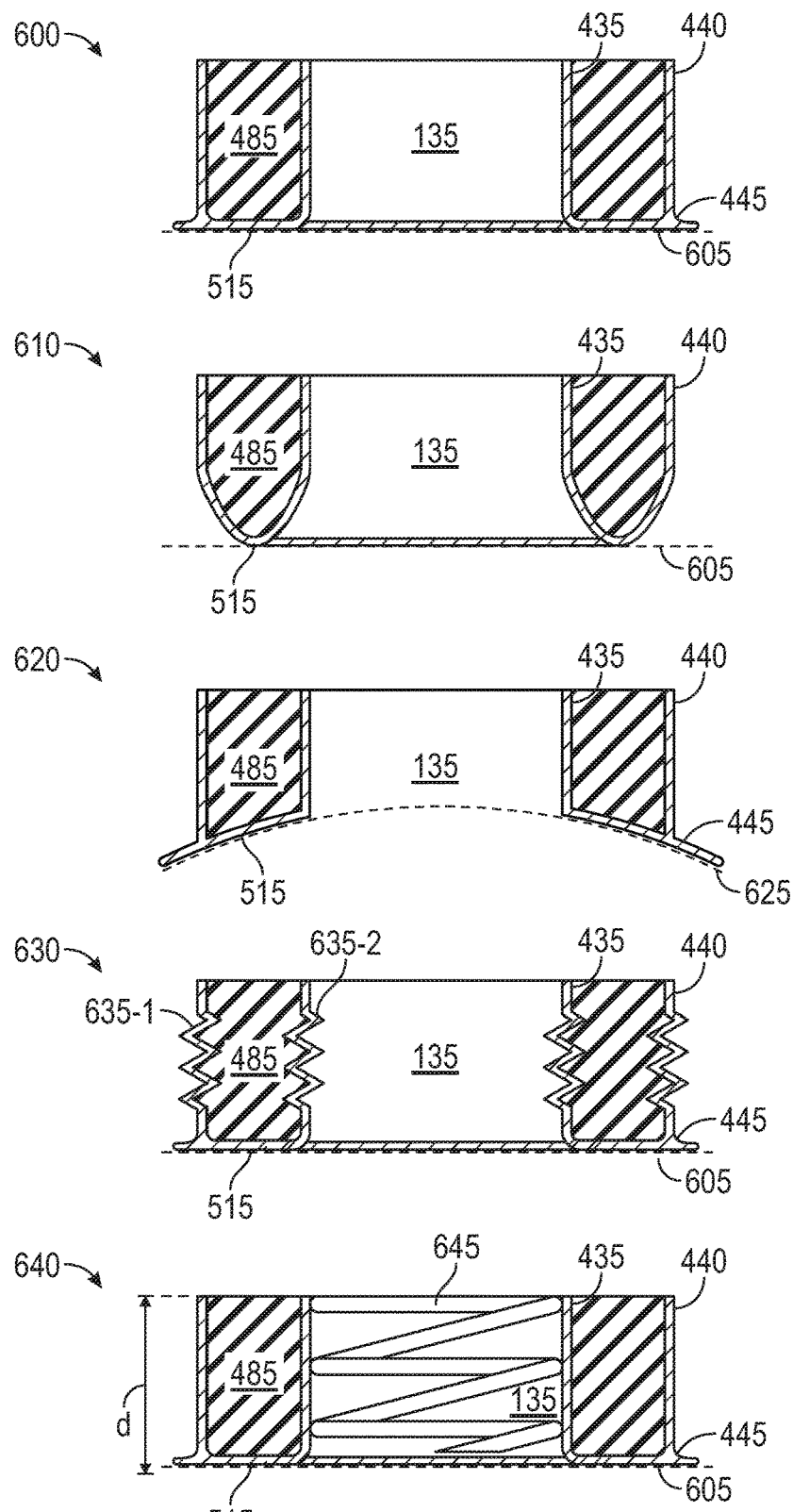
FIG. 6 illustrates several embodiments of a pliable bladder.

FIG. 6 illustrates several embodiments of a pliable bladder. The features described with respect to FIG. 6 may be used in conjunction with other embodiments described herein. In diagram 600, the surface portion 515 is substantially perpendicular to the inner wall 435 and/or the outer wall 440, and is substantially flat within a plane 605. In diagram 610, the surface portion 515 is curved between the inner wall 435 and the outer wall 440, and the curve extends to the plane 605.

In diagram 620, the surface portion 515 is curved along a curve 625. In diagram 630, the inner wall 435 and the outer wall 440 comprise respective bellows sections 635-2, 635-1 that provide flexibility to the inner wall 435 and the outer wall 440. In alternate embodiments, only one of the inner wall 435 and the outer wall 440 comprises a bellows section 635-2, 635-1.

In some embodiments, a reinforcing structure may be disposed within the inner recess 135, and the reinforcing structure is configured to oppose motion of the inner wall 435 into the inner recess 135. In some embodiments, the reinforcing structure has an annular shape with a diameter that is approximately the same as the diameter (d) of the inner recess 135. The annular shape of the reinforcing structure allows the inner recess 135 to remain in fluid communication with the vacuum port 150 via the opening 480-1. The reinforcing structure is constructed to be more rigid than the inner wall 435, e.g., formed of a rigid plastic or metal, formed of an elastomeric material with a greater thickness than the inner wall 435, and so forth. In diagram 640, the reinforcing structure comprises a spring 645 that Sis arranged in the central region 135. In some embodiments, the spring 645 is connected with the base portion of the bladder 110 and is configured to oppose motion into the central region 135 of an item seated on the sealing surface. In some embodiments, a diameter of the spring 645 is approximately the same as the diameter of the central region 135. In this configuration, the spring 645 may provide additional rigidity, e.g., to prevent the inner wall 435 from deforming into the central region 135. In some embodiments, a height of the spring 645 is approximately the same as a height of the central region 135, but this is not a requirement.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be used to implement embodiments of the disclosure. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is any tangible medium that can contain, or store a program for use by or in connection with an instruction execution system, apparatus or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of actuating items using an end effector, the end effector comprising a manifold and a bladder removably attached thereto, the bladder comprising a pliable body that defines an inner recess in fluid communication with a first opening extending through the manifold, the pliable body having a sealing surface at its distal end, the pliable body defining a chamber in fluid communication with a second opening extending through the manifold, the chamber having a material disposed therein, the inner recess and the chamber being fluidically isolated by a first gasket between the manifold and the bladder that circumscribes the first opening, the method comprising:
contacting an item with the sealing surface so as to conform the sealing surface to a contour of the item while the bladder is in a first structural state;
transitioning, via the second opening, the bladder from the first structural state to a second structural state having greater rigidity than the first structural state;
applying a vacuum to the inner recess via the first opening; and
actuating the item.

2. The method of claim 1, wherein contacting the item with the sealing surface comprises minimizing an impactive gripping force on the item.

3. The method of claim 1, wherein transitioning the bladder to the second structural state occurs at least partially during applying the vacuum to the inner recess.

4. The method of claim 1, wherein transitioning the bladder to the second structural state occurs before applying the vacuum to the inner recess.

5. The method of claim 1, further comprising:
releasing the vacuum on the inner recess to release the item at a predefined location.

6. The method of claim 5, wherein actuating the item comprises:
acquiring, using a controller, destination information associated with the item; and
operating, using the destination information, one or more actuators connected with the end effector.

7. An end effector configured to actuate irregularly shaped items, the end effector comprising:
a manifold having a first opening and a second opening extending therethrough;
a bladder removably attached to the manifold, the bladder comprising:
a pliable body that defines an inner recess in fluid communication with the first opening, the pliable body having a sealing surface at its distal end and an opening at its proximal end that is in fluid communication with the second opening, the pliable body further defining a chamber; and
a granular material disposed in the chamber;
a first gasket arranged between the manifold and the bladder, the first gasket circumscribing the first opening and providing fluidic isolation between the inner recess and the chamber;
a first vacuum port in fluid communication with the first opening; and
a second vacuum port in fluid communication with the first opening.

8. The end effector of claim 7, wherein the sealing surface is configured to conform to a contour of an item, the end effector further comprising:
a controller operable to:
apply a vacuum to the inner recess via the first opening to suction the item to the bladder; and
apply a vacuum to the chamber via the second opening, thereby increasing a rigidity of the bladder.

9. The end effector of claim 7, further comprising:
one or more vacuum sources coupled to the first vacuum port and the second vacuum port.

10. The end effector of claim 7, further comprising:
a reinforcing structure disposed within the inner recess, the reinforcing structure configured to oppose motion of an inner wall of the pliable body into the inner recess.

11. The end effector of claim 7, wherein the chamber and the inner recess are concentrically arranged.

12. An end effector configured to actuate irregularly shaped items, the end effector comprising:
a manifold having a first opening and a second opening extending therethrough;
a bladder removably attached to the manifold, the bladder comprising:
a pliable body that defines an inner recess in fluid communication with the first opening, the pliable body having a sealing surface at its distal end and an opening at its proximal end that is in fluid communication with the second opening, the pliable body further defining a chamber; and a material disposed in the chamber;

a first gasket arranged between the manifold and the bladder, the first gasket circumscribing the first opening and providing fluidic isolation between the inner recess and the chamber;

a first vacuum port in fluid communication with the first opening; and a signaling port in functional communication with the second opening, wherein the signaling port communicates a signal to the bladder causing the bladder to transition from a first structural state to a second structural state that is more rigid than the first structural state.

13. The end effector of claim 12, wherein communicating the signal to the bladder causes one or more of: a change to a composition of the material, and a change of state of the material.

14. The end effector of claim 13, wherein the material comprises a fluid, wherein the signaling port comprises a second vacuum port, and wherein the change to the composition of the material comprises evacuating at least part of the fluid from the chamber via the second vacuum port.

15. The end effector of claim 14, wherein the material further comprises a granular material, and wherein evacuating at least part of the fluid from the chamber causes a jamming of the granular material.

16. The end effector of claim 14, further comprising:

a filter disposed between the chamber and the second opening, the filter configured to allow the fluid to pass therethrough and retain a portion of the material in the chamber.

17. The end effector of claim 12, wherein the inner recess and the chamber are concentrically arranged.

18. The end effector of claim 17, wherein the pliable body has a rounded shape.

19. The end effector of claim 12, wherein a diameter of the opening is substantially unchanged when the bladder transitions from the first structural state to the second structural state.

* * * * *